Figure 1:
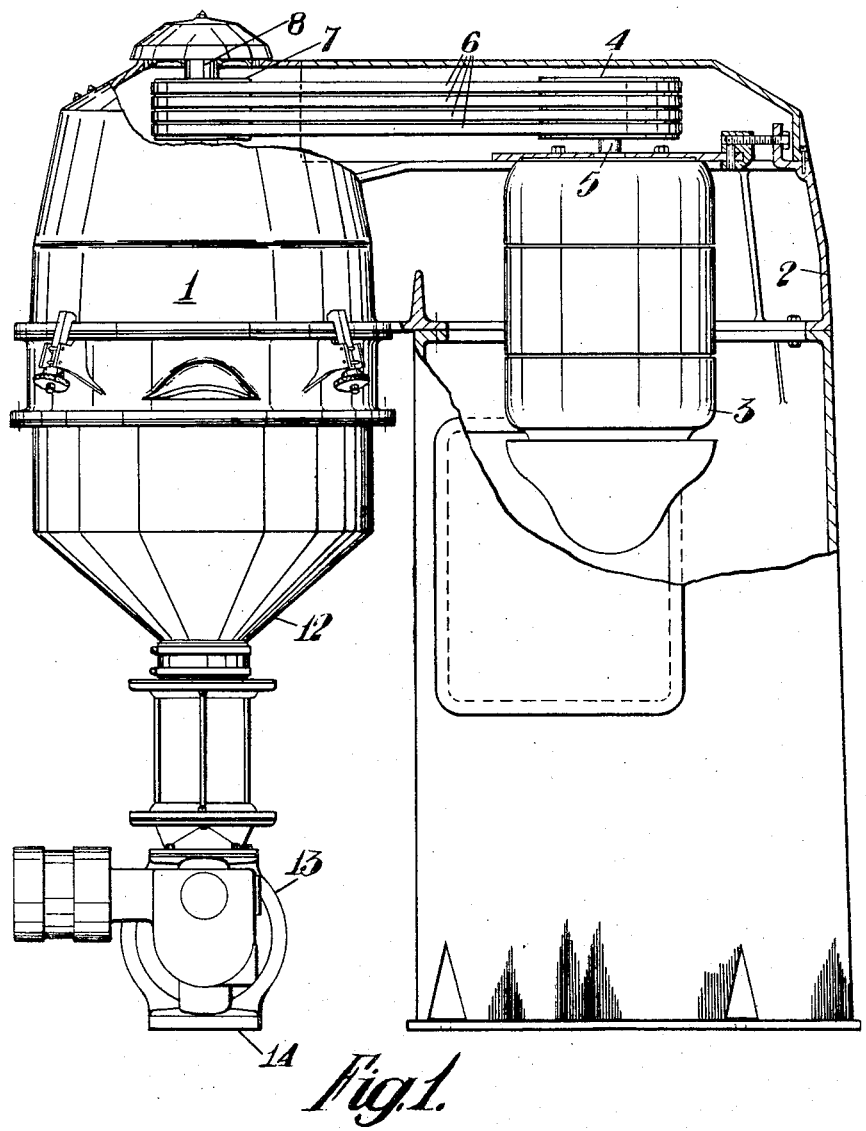

United States Patent Office 2,990,063
Patented June 27, 1961

2,990,063
MEANS FOR DIVIDING THE PRODUCTS OF CEREAL MILLING OPERATIONS OR THE LIKE
David Geoffrey Elias, Strines, Stockport, Thomas Cook Sunter, Sale, and Robert Arthur Scott, London, England, assignors to Henry Simon Limited, Stockport, England, a company of Great Britain
Filed Nov. 9, 1959, Ser. No. 851,854
Claims priority, application Great Britain Dec. 3, 1958
8 Claims. (Cl. 209—144)

This invention relates to classifying means wherein finely divided products of cereal milling operations containing a proportion of proteinaceous material are separated into a fraction containing a higher proportion of protein and a fraction containing a lower proportion of protein, and is particularly related to the type of classifier in which the material and air in which it is to be entrained are directed in a diminishing spiral path in a rotating ring-shaped classifying zone wherein the outward radial centrifugal forces acting on the material particles are opposed by inward radial air drag forces, and also in which the inward flow of air through the classifying zone may be regulated to effect a state of balance of the forces acting on particles of a predetermined size so that particles which are larger than the predetermined size are ejected from the classifying zone to be collected separately from the particles which are smaller than the predetermined size and therefore remain entrained in the air as it passes from the classifying zone.

Known forms of classifiers of this type all share a common disadvantage in that when used to effect a separation in material such as finely divided wheat flour, a peculiarity of the material (to be described later) causes the operation to be less effective and more costly than it would be for perfectly homogeneous materials.

Wheat flour is composed almost entirely of starch granules indigenously embedded in a matrix of protein and when it is finely divided by a suitable form of grinding treatment the larger starch granules, ranging from about 15 microns up to about 40 microns are detached as separate entities from the continuum, a proportion of which is broken down into fragments which are in general much smaller than the larger starch granules. The resulting mixture comprises unbroken aggregates greater than 40 microns, a group of particles ranging from about 15 microns up to about 40 microns in which by far the greater proportion by weight is made up of larger starch granules, and a group of particles of less than about 15 microns containing a correspondingly larger proportion of broken protein continuum; and if this mixture is immediately separated into two fractions one containing particles above about 15 microns and the other containing particles below about 15 microns the coarser fraction will contain less protein than the unclassified mixture while the finer fraction will contain a greater proportion of protein than the unclassified material. It is, however, a characteristic of the proteinaceous particles that they tend to adhere to the unbroken aggregates so that during the passage of the mixture from the grinding means to the classifier conglomerations occur as the proteinaceous particles unite with the unbroken aggregates to produce composite particles larger than the range included in the fine fraction. With known types of classifiers of the kind referred to, a large proportion of these composite particles are not disaggregated but pass directly into the coarse fraction separated by the machine, with the result that the quantity of protein in the fine fraction is less than would be the case if the divided protein particles had remained as discrete entities, and if it is attempted to include in the fine fraction a proportion of these escaping composite particles by raising the classification cut to particle sizes greater than 15 microns, a much larger proportion of starch granules (in which the protein content is practically negligible) will be included in the fine fraction adversely reducing the relative proportion of protein contained therein.

Various forms of spiral classifiers of the referred type are known, such as those described in U.S. Patent No. 2,546,068 and 2,796,173; British Patent No. 693,999 and 694,219; and German Patent No. 940,447 in which the spiral air flow is confined between spaced flanking walls formed substantially either of parallel rotating discs (see U.S. Patent No. 2,546,068 and British Patent Nos. 693,999 and 694,219) or of surfaces of revolution about the driving axis, which increase in axial spacing as the distance from the axis of revolution increases (see U.S. Patent No. 2,796,173). Theoretical arguments have been adduced in the latter case to justify the chosen shapes on the ground that if the spiral flow corresponds substantially to an ideal free vortex, then the cited spacing ensures that at all radii in the classifying zone, the inward drag due to the inward flow of air relative to the particle is equal to the centrifugal force for all entrained particles of a certain critical size.

According to the invention, there is provided a classifier for separating protein-containing material from flour mill stock or performing similar separations of like materials in accordance with particle size and density, comprising a rotor element having axially spaced surfaces of revolution forming the rotating flanking walls of an annular classifying zone, having inner and outer radial boundaries, an annular gap in one of the said flanking walls for feeding material for classification into said classifying zone, in the form of a rotating annular curtain, a casing supporting and enclosing the rotor element and having inlet port means for air and for said material and outlet port means for a separated "coarse fraction" of said material and for air with an entrained "fines fraction" of said material duct means connecting said inner radial boundary of said classifying zone with said air outlet port means and forming the sole outlet means by which air can leave the interior of the casing, means for driving the rotor element material impelling means on the rotor element for directing material received from said inlet port means to said annular gap, impeller means on said rotor element for directing air for flowing from said outer radial boundary of the classifying zone to said inner radial boundary into a circular path so that in passing through the zone it follows a radially unimpeded inwardly moving spiral path rotating in the same direction as said annular curtain of material, the axial spacing of said flanking walls at said outer radial boundary of said classifying zone being less than the axial spacing at said inner radial boundary.

Preferably the rotating wall through which the material passes into the zone is substantially flat and the other rotating wall is dished.

The amount by which the flanking walls of the zone converge in accordance with increasing radial increments of the zone may be such that the cross-sectional size characteristics of the zone may be in accordance with the arrangement that $$\frac{Ro}{Ri}$$

is greater than 1.4, $Hi$ is within the size-range between $0.1\ Ro$ and $0.35\ Ro$, and $$\frac{Ho}{Hi}$$

is less than 0.7; and in a preferred form would be to the arrangement $$\frac{Ro}{Ri} = 1.8$$

$Hi = 0.26$, and $$\frac{Ho}{Hi} = 0.15$$

where $Ro$ is the outer radius of the zone, $Ri$ is the inner radius of the zone, $Ho$ is the axial spacing of the walls at radius $Ro$, and $Hi$ is the axial spacing at radius $Ri$.

In a series of tests on a spiral classifier of the known type having axial spacing characteristics $$\frac{Ho}{Hi}$$

equal to or greater than unity we consistently obtained, from a flour having a 9% protein content, a fines fraction substantially equal to 7% of the total throughput, the said fines fraction having (approximately) a 20% protein content; whereas in a similar series of tests in which all conditions were identical except that the axial spacing characteristics were $$\frac{Ho}{Hi} = 0.15$$

in accordance with the invention we consistently obtained a fines fraction equal to 20% of the total throughput, this fines fraction also having (approximately) a 20% protein content.

It is believed that the unexpected action of the machine in accordance with the invention and the cause of the excellence of its performance in the face of opposite teachings in the prior art may be explained as follows:

Practical classifiers of all known types show some inefficiency in operation of a sort that can be expressed by saying that the coarse fraction contains particles which should have been found amongst the fines and the fines fraction contains particles which should have been found in the coarse. In the known art it has hitherto been the practice to minimise this lack of precision of separation by:

(i) The use of rotating flanking walls with the purpose of maintaining as far as practicable, full rotating flow at the surfaces of the walls.

(ii) The use of flanking walls which diverge in axial spacing as the radius increases and having a shape which, in the case of simple viscous drag forces on the particle and an assumed smooth, perfect, free-vortex flow of the air would give a balance of centrifugal and inward drag forces at all radii in the zone for particles of a certain actual size.

In practical separators built according to these principles, the separation lacks the sharpness which would be expected from simple theories of ideal steady flow, and there remains in general a finite probability less than unity that particles of small size will pass to the coarse discharge and that particles of large size will pass to the fines discharge. The separating characteristics of a separator are conveniently described by a continuous curve of: probability that a particle should emerge from the coarse outlet (plotted as abscissa) versus size of the particle (plotted as ordinate).

In such a curve the probability tends to zero for small particles and to unity for large particles and follows an S-shaped course from its value of roughly zero for small particles to its value of roughly unity for large particles. In terms of such a curve, a machine in accordance with the invention has a zone shape giving a separator performance as represented by the central portion of the S-shaped curve which is inclined very steeply to the particle size axis.

It is believed that the sharpening is achieved because small particles which, because of some disturbing tendency, tend to pass initially towards the outer rather than the inner portion of the zone find themselves in a region for which the probability of their emerging in an outward direction has been reduced very substantially by the action of the much enhanced inward flow velocity of the air associated with the narrowed local spacing of the flanking plates. Such small particles are thereby acted upon in a way likely to cause them to turn back from their initial paths and move to and through the fines discharge in spite of their initial outward courses.

Similarly, as loosely-knit composite particles (formed by the building up of a small proteinaceous and other particles on unbroken aggregates) approach the outer limits of the classifying zone, the action of the much enhanced inward flow velocity of the air associated with the narrowed local spacing of the flanking plates tends to break down the binding forces between the particles so that a large proportion of the adherent smaller particles detach themselves from the composite particles and move to and through the fines discharge.

Figure 2:
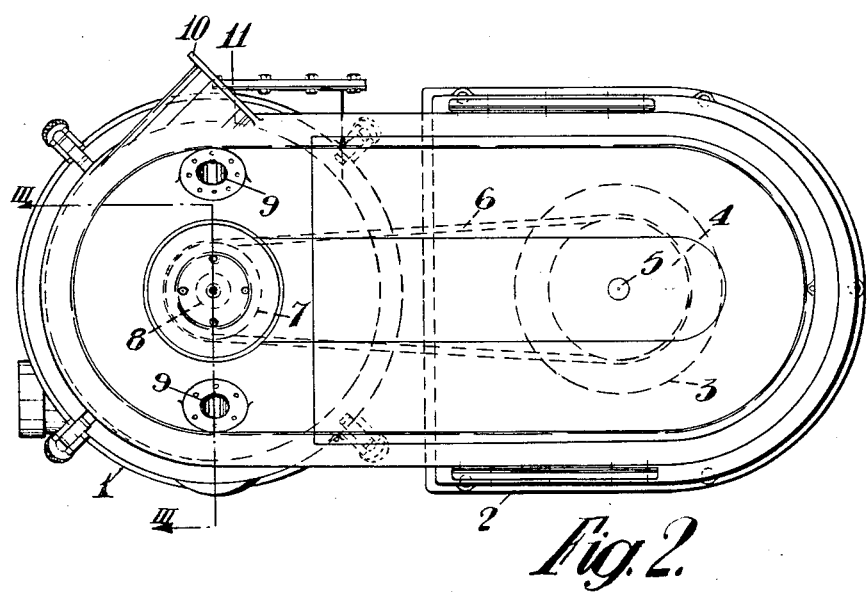
Figure 3:
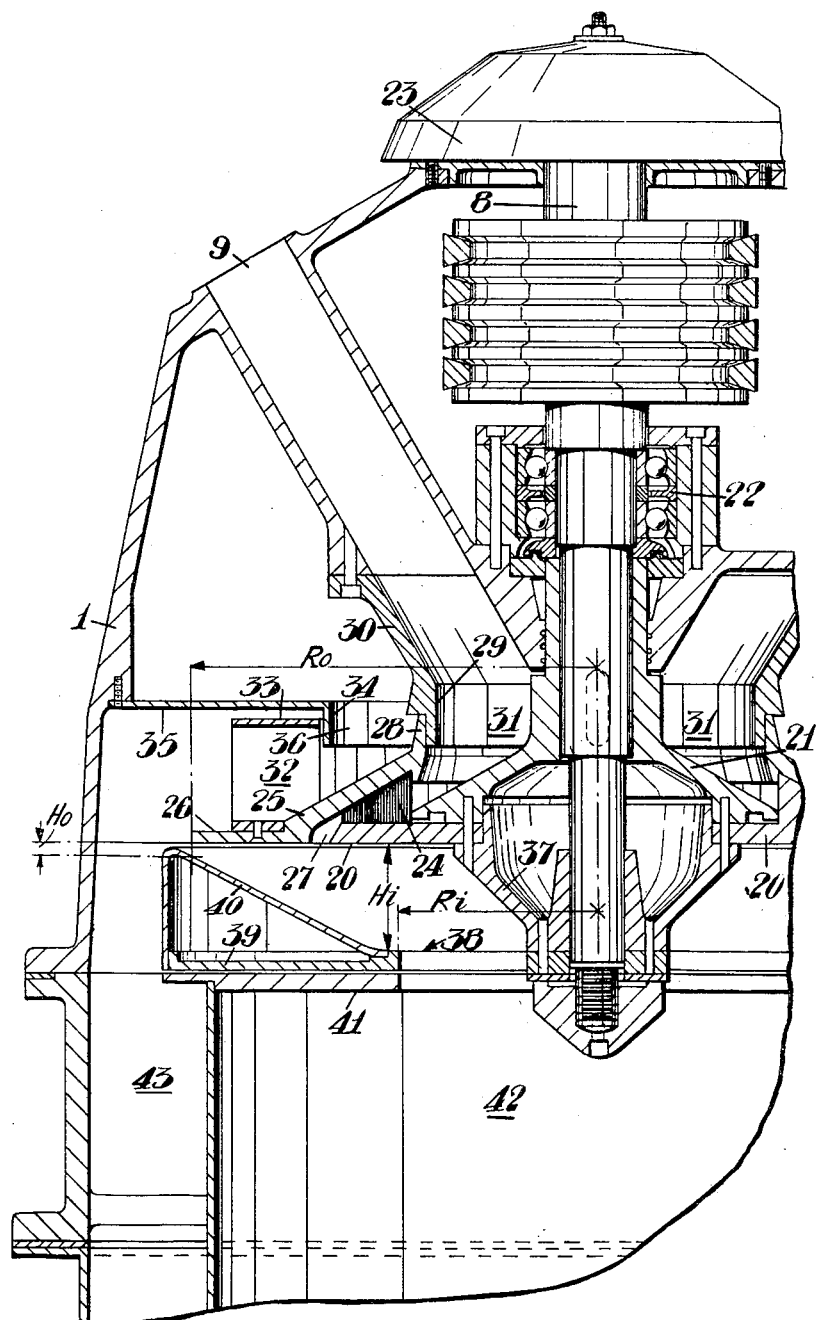

Referring to the accompanying drawings:

FIGURE 1 is an elevation of a classifier in accordance with the invention, the casing being cut away to show the drive arrangement, FIGURE 2 is a plan view of the classifier shown in FIGURE 1, and FIGURE 3 is a fragmentary sectional view taken on the lines III—III of FIGURE 2.

Referring to FIGURES 1 and 2, there is shown a classifier in accordance with the invention, the casing 1 on the left housing the classifier proper and the casing 2 on the right housing the drive motor 3 and other auxiliary control apparatus. The drive is taken from a pulley 4 on the drive motor shaft 5 by V belts 6 to a pulley 7 on the rotor shaft 8 of the classifier, the rotor being driven at a speed in the range of 2,500/3,200 r.p.m. The material to be classified is fed to the two intake ports 9, the inlet air is supplied through the port 10. The fines fraction with the air pass out through outlet 11 and the coarse fraction falls into a hopper 12 and passes out through a rotary air seal 13 and an outlet 14.

FIGURE 3 shows, in more detail, the classifier section which comprises a horizontal disc-like element 20 rigidly attached to or integral with a flared extension 21 of the lower end of the vertical rotor shaft 8 which is rotatably supported in journals 22 and 23. Towards the outer rim of the disc-like element 20 a plurality of radial impeller blades 24 are mounted in such a manner as to support the hollow conical upwards extension 25 of the inner portion of a flat annulus 26 the lower surface of which is in line with the underside of the disc-like element 20 but spaced therefrom so that there is an annular slot 27 between the peripheral extremities of the disc and the associated part of the annulus. The wall of the conical upwards extension 25 terminates in a short cylindrical section 28 which is co-axial with the vertical rotor shaft 8 and arranged in sealing association with a cylindrical section 29 terminating an inwardly extending cone 30 to form an annular guide duct 31 leading from material intake ports 9 to the impeller vanes 24 which accelerate the material so that it passes through the annular slot 27 in the form of a rotating annular curtain. On the upper surface of the flat annulus 26 there is mounted a plurality of radial air impellers 32 arranged so as to support on their upper edges an annular ring 33 whose inner extremity is coaxial with the vertical rotor shaft 8 and arranged in sealing association with a short cylindrical dependent extension 34 of the inner boundary of an annular closure member 35 which isolates the upper portion of the casing 1 from the lower portion thereof except where the short cylindrical extension 34 provides an annular air duct 36 surrounding the previously mentioned annular guide duct 31 and communicating with the radial air impellers 32, so that air entering a tangential port 10 (FIGURE 2) in the said upper portion is passed by the short annular air duct 36 to the impellers 32 which direct it into a circular path within the casing in a manner which will ensure that when the machine is in operation the tangential velocity of the air in the circular path remains constant irrespective of the quantity of air being passed into the machine.

Mounted below the disc-like element 20 and its associated flat annulus 26 and supported on spider limbs (not evident in the drawing) from an inverted cone-shaped extension 37 of the inner extremity of the disc-like element 20 is a lower annulus 38 which has an inner radial boundary R$i$ in conformity with the equation $$\frac{R_o}{R_i} = 1.8$$

when R$o$ is the outer radius of the flat annulus 26. The lower annulus is a composite element comprising a rigid substantially flat member 39 with a sheet metal capping 40 over the upper surface, which capping may be arranged to be interchangeable with other capping giving different zone dimensions. The lower annulus is somewhat larger in diameter than the flat annulus 26 and is mounted in such a manner that at its inner radial boundary R$i$ its upper surface is in a plane axially spaced from the flat underside of the disc-like element 20 and its associated flat annulus by a distance H$i$ equal to 0.26 R$o$. The upper surface of annulus 38 (which is presented by the top side of the sheet metal capping 40) is dished upwardly from its inner radial boundary so that at radius R$o$ it is axially spaced from the underside of the flat annulus 26 by a distance H$o$ in conformity with the equation $$\frac{Ho}{Hi}$$

is substantially equal to 0.15. The ring-shaped space between the periphery of the flat annulus 26 and the bore of the lower annulus 38 and bounded axially by the upper surface of the lower annulus 38 and the underside of the disc-like element 20 and its associated flat annulus 26 thus becomes, in operation, a classifying zone in accordance with the invention.

The underside of the lower annulus is preferably flat and is arranged in sealing association with an internal flange 41 of a stationary cylindrical receiving chamber 42 which is supported from the interior of the cylindrical casing in such a manner as to be substantially coaxial with the vertical rotor shaft. The cylindrical receiving chamber is closed at its bottom extremity by a scroll-channel (not shown) leading to the tangential outlet duct 11 (FIGURE 2) which passes through the wall of the casing 1 to provide a channel by which the classifying air and the fine fraction entrained therein leave the machine.

The casing 1 is extended downwardly to form an inverted cone hopper 12 wherein the coarse fraction is collected and passed out as already mentioned.

In operation, air is caused to flow through the air inlet port 10 of the machine into the upper portion of the casing (preferably by applying suction to the outlet port 11 for the air and fines fraction) and is then directed, as already described, into a circular path within the casing from which it enters the outer extremity of the classifying zone through which it passes in inwardly moving spiral flow to the receiving chamber 42 and outlet duct 11. Material fed at the same time into the appropriate intake ports 9 and accelerated in the manner previously described passes into the classifying zone in the form of a rotating annular curtain whose rotational motion is in substantially the same direction as the flow of air in the classifying zone.

As the material enters the classifying zone it is immediately subjected to the classifying forces applying therein so that particles smaller than the "cut" size are entrained in the air while particles larger than the "cut" size are thrown towards the zone peripheral region wherein composite particles are subjected to a measure of disaggregation and reclassification and from which the coarse fraction is expelled into the lower portion 43 of the cylindrical casing from which it descends into the collecting hopper 12.

Because the tangential speed of the air in the classifying zone is governed by the air impeller 32, the "cut-size" characteristics of the classifying zone can be altered by changing the volume of air passing through the machine in a given period of time without any other adjustment being necessary.

In extension to its application to the separation of the products of cereal milling operations the invention is equally applicable to the separation of other materials having similar re-aggregating characteristics.

What is claimed is:

1. A classifier for separating protein-containing material from flour mill stock or performing similar separations of like materials in accordance with particle size and density, comprising a rotor element having axially spaced surfaces of revolution forming the rotating flanking walls of an annular classifying zone, having inner and outer radial boundaries, an annular gap in one of the said flanking walls for feeding material for classification into said classifying zone, in the form of a rotating annular curtain, a casing supporting and enclosing the rotor element and having air inlet port means, material inlet port means, outlet port means for a separated "coarse fraction" of said material and further outlet port means for air with an entrained "fines fraction" of said material, duct means connecting said inner radial boundary of said classifying zone with said air outlet port means and forming the sole outlet means by which air can leave the interior of the casing, means for driving the rotor element material impelling means on the rotor element for directing material received from said material inlet port means to said annular gap, impeller means in said rotor element for directing air for flowing from said outer radial boundary of the classifying zone to said inner radial boundary into a circular path so that in passing through the zone it follows a radially unimpeded inwardly moving spiral path rotating in the same direction as said annular curtain of material, the axial spacing of said flanking walls at said outer radial boundary of said classifying zone being less than the axial spacing at said inner radial boundary.

2. A classifier as claimed in claim 1, wherein the rotating wall through which the material is passed into the zone is substantially flat and the other rotating wall is dished.

3. A classifier as claimed in claim 1 wherein, if R$o$ is the outer radius of the classifying zone, R$i$ is the inner radius of the zone, H$o$ is the axial spacing of the walls at radius R$o$ and H$i$ is the axial spacing at radius R$i$ $$\frac{Ro}{Ri}$$

is greater than 1.4, H$i$ lies between 0.1 R$o$ and 0.35 R$o$, and $$\frac{Ho}{Hi}$$

is less than 0.7

4. A classifier as claimed in claim 3, wherein $$\frac{Ro}{Ri} = 1.8$$

H$i$ = 0.26 R$o$ and $$\frac{Ho}{Hi} = 0.15$$

5. A classifier as claimed in claim 2, wherein the dished wall is provided by a flat annular member on the zone side of which is secured a sheet metal capping which gives the desired dimensions to the zone.

6. A classifier as claimed in claim 5 wherein the capping is arranged to be interchangeable with other cappings giving different zone dimensions.

7. A classifier as claimed in claim 1 wherein the rotating wall through which the material enters the zone, comprises an inner and an outer portion between which extends the annular gap, the outer portion adjacent the gap having a conical inward extension which is united to the inner portion of the wall by said material impelling means in the form of radial impeller blades.

8. A classifier as claimed in claim 1 wherein said air impeller means is provided towards the outer extremity of the back side of the rotating wall through which the material enters the zone and arranged to direct air into a circular path of substantially constant tangential velocity irrespective of the quantity of air being passed into the classifier.

References Cited in the file of this patent
UNITED STATES PATENTS

| | | |
|---|---|---|
| 2,276,761 | Carey | Mar. 17, 1942 |
| 2,796,173 | Payne | June 18, 1957 |